United States Patent [19]

Agricola et al.

[11] 4,281,410
[45] Jul. 28, 1981

[54] CIRCUIT ARRANGEMENT FOR TELECOMMUNICATIONS ESPECIALLY TELEPHONE INSTALLATIONS THAT SWITCH THROUGH DIGITALLY BY TIME DIVISION

[76] Inventors: Manfred Agricola, Zeuläckerstrasse 10B, 6000 Frankfurt 60; Klaus Dietze, Niedwiesenstr. 25a, 6000 Frankfurt 50; Horst Mayr-Stein, Spiessfeldstr. 1, 6382 Friedrichsdorf; Karl-Heinz Reimer, Brandenburgerstr. 1, 6051 Ober-Roden; Andreas Reinhold, Jägerstrasse 9, 6457 Maintal 3; Adolf Schmid, Hammarskjöldring 27, 6000 Frankfurt 50; Johannes-Georg Schosnig, An der Lühe 10, 6 Frankfurt 90, all of Fed. Rep. of Germany

[21] Appl. No.: 32,371

[22] Filed: Apr. 23, 1979

[30] Foreign Application Priority Data

Apr. 29, 1978 [DE] Fed. Rep. of Germany ....... 2819119

[51] Int. Cl.³ ............................................... H04J 3/12

[52] U.S. Cl. ........................................ 370/110; 370/62
[58] Field of Search ................ 370/110, 62, 67, 58

[56] References Cited

U.S. PATENT DOCUMENTS

| 3,443,033 | 5/1969 | Louis | 370/110 |
| 3,870,826 | 3/1975 | Carbrey et al. | 370/110 |
| 4,110,562 | 8/1978 | Moed | 370/62 |

FOREIGN PATENT DOCUMENTS 2028907 12/1971 Fed. Rep. of Germany ............ 370/58

*Primary Examiner*—Douglas W. Olms
*Attorney, Agent, or Firm*—Jacobson and Johnson

[57] ABSTRACT

A circuit arrangement for telecommunications, in particular telephone exchange installations that switch through digitally by time division, having a special coupling network for switching audio-signals to terminal units which, besides the connection network provided for the interchange of speech and data information, sets up the connection between terminal units and audio-signal senders and works digitally.

6 Claims, 1 Drawing Figure

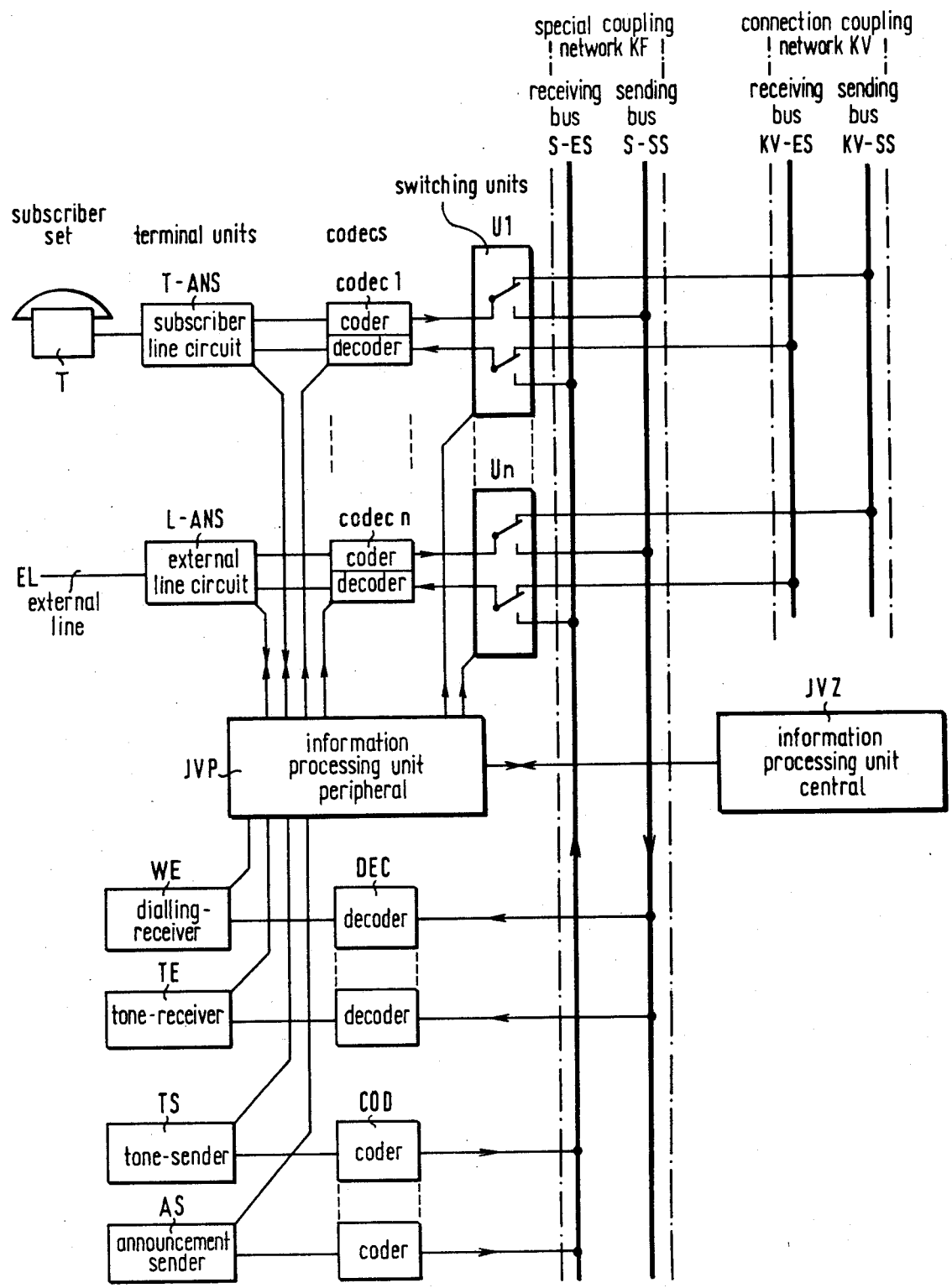

CIRCUIT ARRANGEMENT FOR TELECOMMUNICATIONS ESPECIALLY TELEPHONE INSTALLATIONS THAT SWITCH THROUGH DIGITALLY BY TIME DIVISION

BACKGROUND OF THE INVENTION

The task of exchange installations is not only to switch through a connection for making possible an interchange of information between two terminal stations, but also during the setting-up phase of a connection which is originated automatically by the subscriber, information to the subscriber is necessary to tell him about the state of his connection. On each connection, the first information needed about the readiness for dialing of the exchange is transmitted to the subscriber as dial-tone on lifting the handset. The dial-tone mostly consists of a standardized frequency which is sent permanently or in a determined sequence.

When a subscriber has finished his dialing procedure completely, a ringing or busy tone is sent to him after checking the possible connection paths and the condition of the wanted terminal. There would be ringing the wanted subscriber but the busy-tone interval is clearly different, for example, a speedy sequence of the standardized frequency.

Besides the audio-tones, there are further possibilities to inform a calling subscriber. For example, it is useful to give a special indication to a subscriber who has dialed to a non-existent connection path or terminal. In this case the normal busy-tone is not sufficient, because the subscriber will keep on trying to get the wanted connection. Such an indication information may, for example, consist of a special tone sequence and a following announcement: "No connection possible when dialing this number".

In many cases it is further desired to send common valid information to the subscribers. These special announcement services can comprise, for example, time announcement, weather forecast, news, etc.

In most exchanges the audio-tones, indication information and announcements are switched through via the common network that is used for speech connections. The consequence of this is that while switching on special signals of the described kind, the coupling paths are not available for real connections. Therefore an existing coupling network is less efficient for real connections.

To avoid this disadvantage it was proposed for PCM-exchanges to store tone signals digitally and to send them in this form directly to terminal sets. Such an arrangement is described in the German patent application DT-OS No. 19 45 155. In the German patent DT-PS No. 23 14 272 is described how the sequence of an audio-tone can be included also in the digital form. These arrangements are disadvantageous as they are only applicable for tone frequency signals, because the storage expenses for announcement texts in the digital form would increase enormously.

The instant invention provides a circuit arrangement which is applicable for all kinds of special signals and special information and is also able to receive the dialing and special information signals coming from the terminals.

The advantage of the invention is that for all signals which are to be interchanged between the exchange and the terminals there is a bus system available whereby the loading of the remaining coupling network by such connections is totally avoided.

Owing to the fixed coordination of time channels to the different special signals, an exchange can be fitted easily with several kinds of signals according to the case of application. As all controlling functions for the special coupling network are resolved by a peripheral control unit, for all these connections no additional expenses are necessary. All connections to tone receivers, tone senders and announcement text senders are kept away from the remaining connection coupling network that provide real connections. Owing to this clear organization, exchanges are able to be dimensioned favorably more easily. Thus, for example, a special switching network for special signals can be added without making necessary any modifications at the coupling network KV of the installation or at the whole arrangement. With the application of integrated multiplex circuits, the costs for each terminal unit are also then still acceptable.

SUMMARY OF THE INVENTION

An embodiment of the invention is described as follows with reference to the drawing:

BRIEF DESCRIPTION OF THE DRAWING

The FIGURE is a block diagram of the digital telephone exchange of the invention.

Subscriber sets T and external lines EL are connected to their line circuits T-ANS and L-ANS respectively. A codec (codec 1 to codec n) which consists of a coder and a decoder for digitizing analog signals and converting digital words into analog signals is coordinated with each line circuit. Each of these decoders is connected with respectively corresponding switching unit (U1 to Un) which have an access to the sending and receiving buses (SS amd ES) for special coupling network KF as well as to those of the connection coupling network KV.

The terminal units, identified as subscriber line circuits T-ANS and external line circuits L-ANS, are controlled by a peripheral information processing unit JVP which has an individual access to each circuit. The peripheral information processing unit JVP is also connected to each codec and to each switching unit by individual control lines for controlling interrupts and switch-over-procedures. The switching units U1 to Un, shown in the drawing as switch contacts, preferably comprise semiconductor gates that are operatively controlled by the peripheral information processing unit JVP.

The sending bus S-SS of the special coupling network, KF, where tone frequency information coming from the subscriber or external lines is sampled, is coupled via the individual decoders DEC to dialling-receivers WE and tone-receivers TE. These devices, also controlled by the peripheral information processing unit JVP, receive tone-frequency dialling information and other signals given by audio-tones coming from the lines.

All the tone-senders TS and announcement senders AS are connected to the receiving bus S-ES of the special coupling network KF via individual coders COD. On this receiving bus S-ES the decoders, as part of the codecs 1-n belonging to subscriber or external line circuits, receive tones or announcements in a digitized form that must be sent out via the line as audible tones or speech.

The connection coupling network KV consists of a sending bus KV-SS and a receiving bus KV-ES where all switching units Ul to Un of the line circuit 1-n are linked together. The switching units can be switched either to the special coupling network KF or to the connection coupling network KV under the control of the peripheral information processing unit JVP. The latter switching procedure is performed only in case of a real speech connection between the two lines of the same or to another exchange by the assistance of a central information processing unit JVZ.

The central information processing unit JVZ controls the connection coupling network KV and cooperates with the peripheral processing units JVP on duplex communication lines. The central information processing unit JVZ is only required when a real speech path must be established via the connection coupling network KV.

DESCRIPTION OF THE PREFERRED EMBODIMENT

At first it is considered that by a subscriber T fitted with tone frequency dialing (MFV) a connection shall be originated. On lifting the handset the peripheral information processing unit (JVP) is effected to switch the subscriber line circuit (T-ANS) on the time channel provided for the audio frequency (425 Hz) via bus S-ES. When a free dialing receiver is available this is switched to the sender but via the time channel associated with it. The subscriber hears the dial-tone, because a rhythmical interrupt of the permanent tone is caused by JVP, in the line circuit T-ANS, in the CODEC or within switching unit U. If no dialing receiver is available, only the sequence is changed thus originating the busy-tone.

On the transmitting side, subscriber T is connected to dialing receiver WE via T-ANS, CODEC1, U1, S-SS and can give off his dialing information as there is readiness for dialing. Via the path from tone sender TX, COD, S-ES, U1, CODEC1, T-ANS the subscriber hears the dial-tone. This part of the connection mentioned last is interrupted at the switching unit U1 as soon as the subscriber begins dialing. The transmitting connection between T and WE remains existing until the subscriber has given off a dialing information that can be evaluated.

On the end of selection criterion that occurs then, the unit JVP applies itself to a central information processing unit JVZ for checking the condition of the wanted subscriber who probably belongs to another group of subscribers. If this subscriber line is free, a free connection path must be found and selected via coupling network KV.

The calling subscriber is switched to the tone channel like at the beginning and hears the ringing or busy-tone. The dialing receiver is thereby switched off.

Only then when the wanted subscriber answers the selected connection path within coupling network KV is switched through and the switching units U are directed to coupling network KV. Before beginning of the conversion the subscriber originating a connection had been connected only via the bus system of coupling network KF.

In the same way processing is made on a subscriber with pulse dialing but the only difference is that the dialing information is received directly by a scanning unit within JVP.

A connection coming from another exchange via an external line EL and line set L-ANS is handled in the same way. There is no difference needed between a subscriber station and an external line on the receiving of dialing information and on sending of tones.

Now let's consider the case that the code of the automatic time announcement is dialed by a subscriber or via an external line. All procedures until the end of the selection run are as already described. When the control unit JVP has recognized the code of the time announcement the calling terminal T-ANS or L-ANS is connected to receiving bus S-ES via its CODEC unit and switching unit U. The switching through takes place at a time channel, for example, 24 which is constantly accorded to the text sender for time announcement. This kind of connection can be handled exclusively via the special coupling network provided for special signals without the need of crosspoints or control units of other parts of the installation. Thus it is also possible to connect more terminals to one channel simultaneously, whereby an exceptionally favorable utilization of the special coupling network is achieved, which has a full availability.

Another advantageous case of application of the invention is given when, for example, subscriber T wants to set up a connection via the external line and a conversion of dialing information must be made. So it could be conceived that multi-frequency signals are to be converted into dial pulses. The inverse conversion from dial pulses into multi-frequency dialing is also imaginable. This version is described, for example, as follows:

When a subscriber has dialed the numbers needed for an external connection, a connection is switched from external line EL to subscriber T via L-ANS, CODECn, Un, KV-ES, Ul and T-ANS. Because the external connection requires the following dialing in the form of multi-frequency signals, a connection to the tone senders is set up as follows:

According to the combination of frequencies that belong to a pulse dialed number, a connection is switched from tone sender TS via CODn, S-ES, Un to terminal set L-ANS on the time channel which is constantly accorded to the related tone sender. After sending out of the related frequency combination with the needed duration, a pause is made and then a switching over to the time channel that belongs to the next frequency combination to be sent out. In this way, all numbers belonging to a complete dialing information are sent out.

This kind of sending out of dialing information also takes place when a subscriber, to whom this class of service is attached, recalls a number by abbreviated dialing which is stored individually for him. The details (store, control unit, etc.) for this procedure are not presented, because they are not considered part of the instant invention.

For making easy the cooperation of exchanges which are switched together via external lines, tone receivers TE are provided. These are switched to a connection when an external line is seized for an outgoing call and serve for receiving the dial tone hereby recognizing the readiness for dialing of the other exchange. Thereby it is possible to recall a stored dialing information or a part of it at the right time and it is avoided that the sending of dialing information begins too early. Therefore, a connection is set up on the associated time channel from TE to the external line via DEC, S-SS, Un CODECn and L-ANS. The peripheral control unit JVP is then able to recognize the moment for sending out the dialing information. This connection can be used moreover for recognizing an end of selection criterion by the received ringing or busy-tone. In the case of busy condition, an automatic release of the connection can be obtained, thereby the seized line becomes free. The busy-tone is sent to the subscriber on a direct path as already described.

When a number was dialed which cannot lead to a connection, an indication tone with a following announcement is sent to the subscriber or to the external line. Thereby first tone sender TS for the first tone is switched on the associated time channel to the calling terminal for a predetermined time via bus S-ES. Afterwards, a switch-over is made to the time channels for the next tones in turn. At last the time channel for the according announcement that comes from the announcement sender is switched on. Here several combinations can be put together by programming of the control unit as desired.

For sending of tones a combination of tone sender and coder is applicable the same way as digitally stored information that can be recalled sequently.

By these examples it is shown that by application of the invention an important part of the traffic load in an exchange caused by special connections, setting up of connection phases, incomplete connections, etc. can be kept away from coupling network KV and the associated control units.

Owing to the full availability of the coupling network for special signals and by the possibility of parallel switching of terminal sets on time channels, one bus system is able to serve for a great number of terminals. The following list shows how the distribution of, for example, 30 channels of a bus system to the single special signals can be managed.

| channel | signals | |
|---|---|---|
| 1 | 1 | |
| 2 | 2 | |
| 3 | 3 | |
| 4 | 4 | |
| 5 | 5 | dialing numbers according to |
| 6 | 6 | CCITT - code, for example, |
| 7 | 7 | multi-frequency method |
| 8 | 8 | |
| 9 | 9 | |
| 10 | 10 | |
| 11 | # | additional signals |
| 12 | * | (dialing keyboard) |
| 13 | | |
| 14 | | supplement signals included |
| 15 | | within the twice 1 out of 4 |
| 16 | | code |
| 17 | | |
| 18 | | frequencies for indication tone |
| 19 | | |
| 20 | | audio tone 425 Hz |
| 21 | | |
| 22 | | indication announcements |
| 23 | | |
| 24 | | time announcements |

-continued

| channel | signals |
|---|---|
| 25 | weather forecast |
| 26 | news |
| 27 | theater programs |
| 28 | |
| 29 | other possibilities |
| 30 | |

We claim:

1. In a digital telephone exchange with time division multiplex switching having a plurality of terminal units for the connection of subscriber lines and external lines wherein each terminal unit is individually connected with external lines and with a codec, said codec comprising a coder and decoder for the analog to digital and digital to analog conversion of the subscriber signals and wherein the digital switching is performed via a connection coupling network, said coupling network comprising a sending and receiving bus, whereby the coder of each codec has access to said sending bus and the decoder of each codec has access to said receiving bus and the switching within the connection coupling network is performed by switching units controlled by a peripheral and by a central information processing unit, the improvement comprising:
   - a second special coupling network which consists of a sending and a receiving bus;
   - a plurality of receivers such as dialling receivers and tone receivers which are connected via decoders with the sending bus of said second special coupling network;
   - a plurality of senders such as tone senders and announcement senders which are connected via coders with the receiving bus of said second special coupling network; and
   - means for selectively switching the terminal units to the coupling network or to the second special coupling network.

2. A digital time division telephone system as claimed in claim 1 in which said switching means comprises a switching unit associated with each codec, each switching unit having a first and a second switch for selectively connecting the codec coder and decoder with the sending buses and receiving buses of the respective coupling networks.

3. A digital time division telephone system as claimed in claim 1, in which an own time channel is associated with each signal on the receiving bus and the signals consist of signal tones or speech information.

4. A digital time division telephone system as claimed in claim 3 wherein the sequence of an audible tone is controlled in the switching unit that is associated with the codec of a terminal.

5. A digital time division telephone system as claimed in claim 3 wherein the controlling of the sequence of a received audio tone takes place with the codec associated with a terminal unit.

6. A digital time division telephone system as claimed in claim 3 wherein the controlling of the sequence of a received audio tone takes place within the terminal unit.

* * * * *